Jan. 10, 1928.
F. C. DORAN
1,655,988
DIRT SCRAPER FOR AUTOMOBILES
Filed May 24, 1927
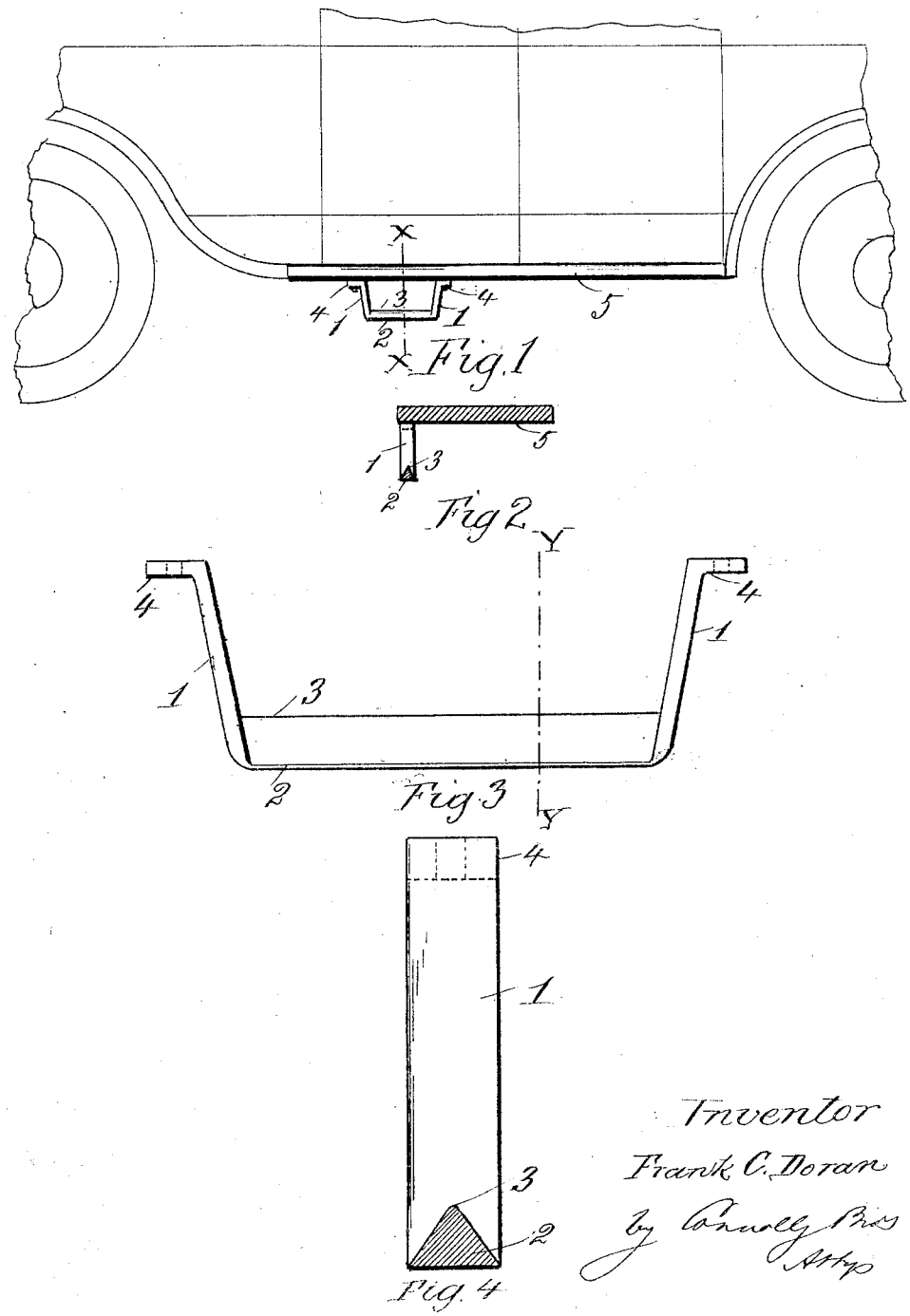
Inventor
Frank C. Doran Patented Jan. 10, 1928.

1,655,988

UNITED STATES PATENT OFFICE.

FRANK C. DORAN, OF TRENTON, NEW JERSEY.

DIRT SCRAPER FOR AUTOMOBILES.

Application filed May 24, 1927. Serial No. 193,802.

This invention has relation to dirt scrapers for the removal of mud, clay or other objectional material from the soles of shoes and has for its object the provision of a scraper to be attached to the running board of an automobile to afford users of the vehicle adequate and efficient means for the cleaning of their shoes before entering the car, and for preventing the dirt removed from the shoe soles from being dragged into the body of the vehicle or spread upon the foot-board.

The dirt scraper embodying my invention is intended and adapted to wholly eliminate the use of ribbed or roughened plates of the surface of running boards, and consists of a scraper so constructed that it may be attached to the under side of the running board of an automobile, and can be conveniently used by one entering the vehicle in such a manner as to not only remove the dirt from the shoes, but cause it to fall to the ground instead of remaining in the scraper.

In the accompanying drawing illustrated a referred embodiment of my invention Fig. 1 is a skeleton side view of an automobile with my improved dirt scraper in proper position.

Fig. 2 is a section on the line X—X of Fig. 1.

Fig. 3 is a face view of the scraper.

Fig. 4 is a vertical sectional view of the scraper on the line Y—Y of Fig. 3, the device being represented as of a convenient size for actual use.

The scraper consists of a bracket composed of the vertical or nearly vertical arms 1, 1, connected together at their lower ends by a horizontal bar 2, which latter constitutes the actual scraping blade, and is conveniently made of triangular form in cross section, so as to provide a scraping edge 3, at its upper part.

At their upper ends the arms 1, 1, are provided with outwardly turned flanges 4, pierced for the passage of bolts or screws, by which the device is attached to the running board, 5.

The space between the arms 1, 1, and above the bar 2, is large enough for the easy insertion of the fore part of the shoe, which is inserted in the space and the scraping blade made use of in the obvious and well known way.

The scraper may be made of any suitable metal, such as aluminum, iron, brass or steel, and may be of any appropriate design embracing the essential mechanical features. The bracket or scraper is to be attached by bolts or screws to the under side of the running board near its outer edge, and in any convenient position relatively to the door or doors of the vehicle. There may be more than one scraper attached to each running board, preferably one scraper to each door.

I claim:

1. As a new article of manufacture a dirt scraper for motor vehicles, consisting of a one piece bracket having suspension arms with bolt holding lugs at their upper ends, whereby they may be secured to the underside of a running board, and having a connecting scraper bar formed with a relatively wide horizontal base and having its sides sloping therefrom, towards each other and forming a scraper edge at the top of the base, said bracket being entirely of rigid, inflexible structure.

2. As a new article of manufacture, a dirt scraper for the running board of a motor vehicle, consisting of an approximately U shaped metallic bracket comprising suspension arms and a horizontal scraper bar, said arms being oblong in cross section and formed with lugs bored for the passage of fastening bolts and adapted to be attached to the underside of said running board, said arms and scraper bar being of greater lateral width than thickness, whereby rigidly and inflexibility are secured, all the parts of the device being integral.

In testimony whereof I affix my signature.

FRANK C. DORAN.